(12) United States Patent
Thayyoor et al.

(10) Patent No.: US 7,958,290 B2
(45) Date of Patent: Jun. 7, 2011

(54) SERIAL BIT ORDERING OF NON-SYNCHRONOUS BUS SIGNALS

(75) Inventors: Jaishankar Thayyoor, Kent, WA (US); Peter Martin, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 1208 days.

(21) Appl. No.: 10/993,702

(22) Filed: Nov. 19, 2004

(65) Prior Publication Data
US 2006/0112202 A1    May 25, 2006

(51) Int. Cl.
*G06F 13/12* (2006.01)
*G06F 13/38* (2006.01)

(52) U.S. Cl. ............................ 710/71; 710/301; 710/302

(58) Field of Classification Search .................... 710/71, 710/307, 301–302
See application file for complete search history.

(56) References Cited

U.S. PATENT DOCUMENTS

| | | | | |
|---|---|---|---|---|
| 5,649,124 A * | 7/1997 | Kreidl | ............................ | 710/305 |
| 5,951,666 A * | 9/1999 | Ilting et al. | ....................... | 710/71 |
| 6,009,488 A | 12/1999 | Kavipurapu | ................... | 710/105 |
| 6,587,909 B1 * | 7/2003 | Olarig et al. | ................... | 710/302 |
| 6,678,775 B1 * | 1/2004 | Zink | ............................... | 710/301 |
| 6,772,263 B1 * | 8/2004 | Arramreddy | ................... | 710/302 |
| 6,820,197 B2 * | 11/2004 | Benedix et al. | .................... | 713/1 |

OTHER PUBLICATIONS

"TPS2340A Dual-Slot PCI Hot Plug Power Controller"; Texas Instruments; Aug. 2002; all pages.*

* cited by examiner

*Primary Examiner* — Ryan Stiglic
(74) *Attorney, Agent, or Firm* — Trop, Pruner & Hu, P.C.

(57) ABSTRACT

The quantity of input and output signal lines that must be directly supported by a bus logic to transmit signals to and receive signals from bus devices is minimized by serializing the states to be driven onto the output signal lines and serially transmitting those states to one or more external shift registers having parallel outputs to drive output signal lines, by receiving states of input signal lines at parallel inputs to one or more other external shift registers to be serialized and serially transmitted to the bus logic, wherein the order in which the states to be driven onto the output signal lines is such that those states corresponding to actual output signal lines are the last states to be serially transmitted, and wherein the order in which the states received from the input signal lines are transmitted to the bus logic is such that those states corresponding to actual input signal lines are transmitted first to the bus logic, thereby also minimizing the quantity of shift registers required externally of the bus logic.

19 Claims, 8 Drawing Sheets

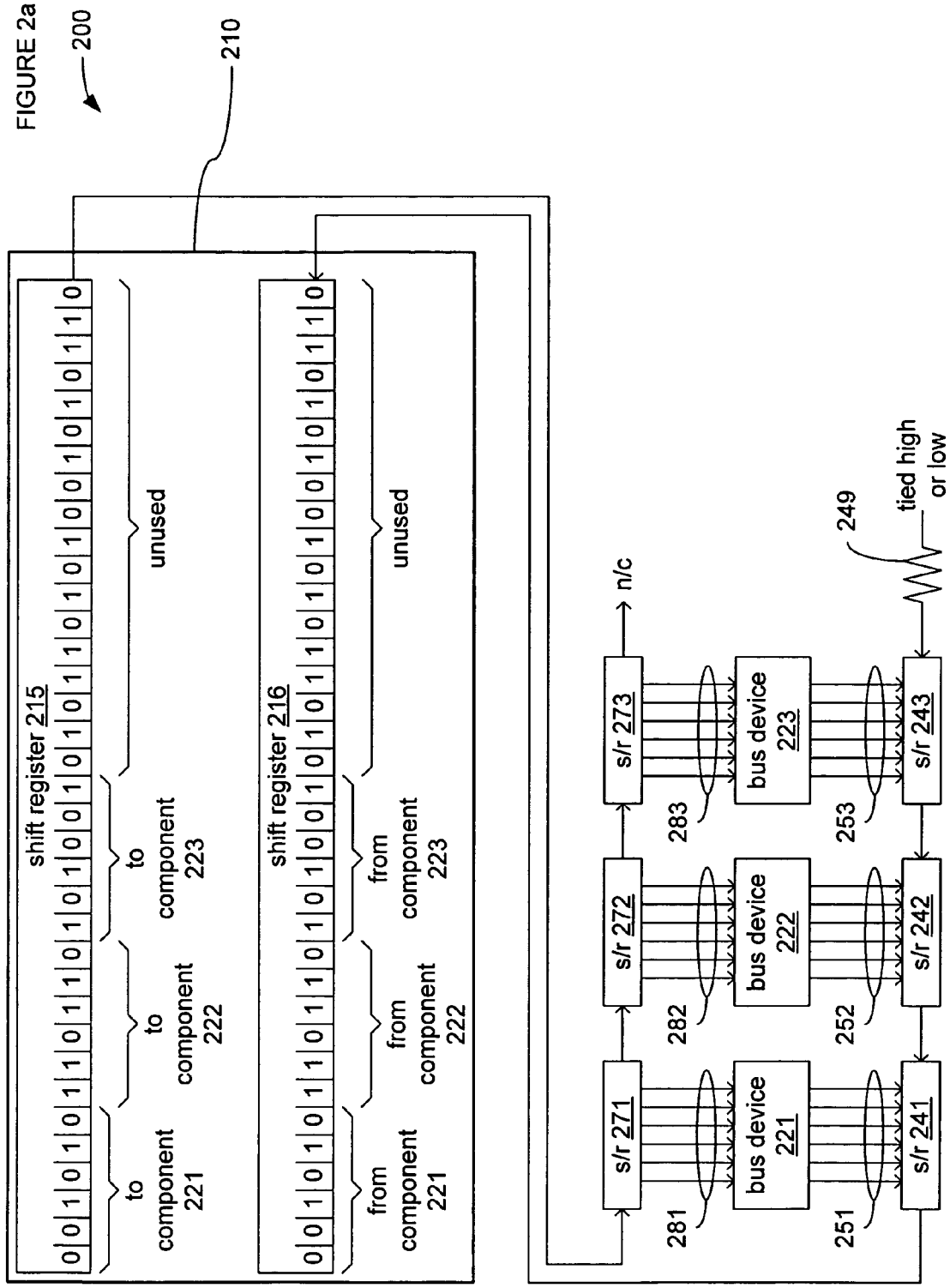

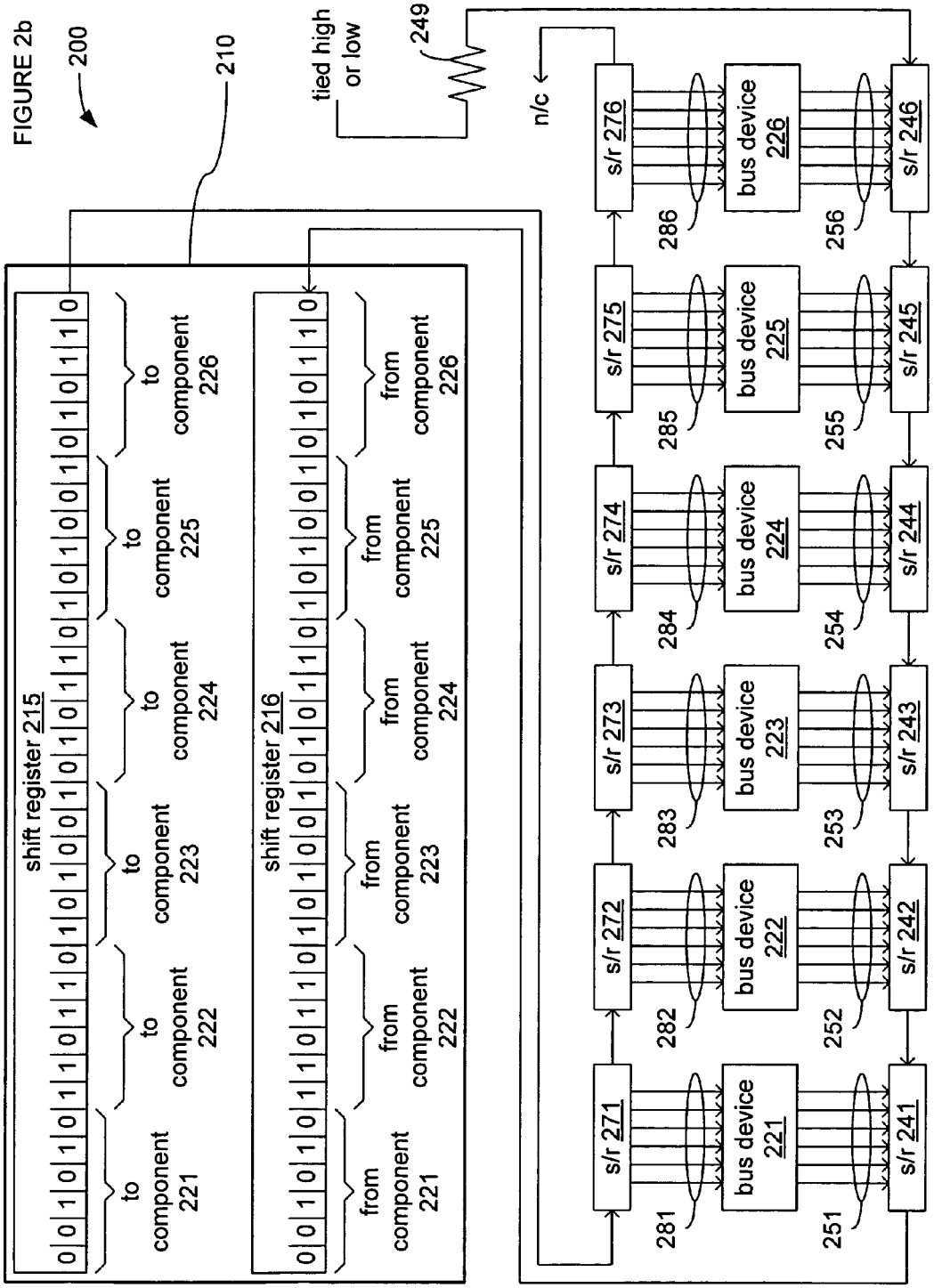

US 7,958,290 B2

SERIAL BIT ORDERING OF NON-SYNCHRONOUS BUS SIGNALS

BACKGROUND

In the field of digital electronics, especially in the area of computer electronics, the rate at which data is transferred between devices continues to be driven ever higher. This has lead to the inception of a great number of bus designs created to meet the goal of achieving ever higher rates of transfer of data. Various approaches to achieving higher transfer rates continue to be explored, including higher clock rates, lower voltage signaling, differential signaling, point-to-point connections, and widening of data paths. Some of these approaches have the disadvantage of requiring that integrated circuits (ICs) that are to be coupled to buses using such approaches be designed to accommodate an increased quantity of I/O signals, especially such approaches as widening the data path or employing a multiple point-to-point connection topography in place of a single multi-drop bus topography.

Designing ICs to accommodate an increased quantity of I/O signals often requires adding more electrical contacts (i.e., "pins") to their packages. Considerable costs can be added to the manufacture of ICs with the addition of each of additional pin, especially where enough additional pins are required that the size of an IC package must be increased. Also, additional pins and/or larger package sizes often create greater physical challenges in attaching an IC to a circuit-board, whether through direct soldering or through a socket, which can also increase costs. Therefore, it is desirable to find ways to design such ICs to interact with new bus designs permitting higher throughput while endeavoring to keep the number of additional pins required over previous bus designs to as much of a minimum as possible.

BRIEF DESCRIPTION OF THE DRAWINGS

The objects, features, and advantages of the present invention will be apparent to one skilled in the art in view of the following detailed description in which:

FIGS. 2a and 2b are block diagram of contrasting embodiments employing reception and transmission of non-synchronous signals.

DETAILED DESCRIPTION

In the following description, for purposes of explanation, numerous details are set forth in order to provide a thorough understanding of the present invention. However, it will be apparent to one skilled in the art that these specific details are not required in order to practice the present invention.

Embodiments of the present invention concern providing support for additional signals for use with buses while limiting the number of actual I/O signals required to be supported through direct connections by the package of an IC. Although the following discussion centers on support for signals not necessarily synchronized to buses within a computer system for such functions as interrupt handling, bus arbitration and hot-plugging support, it will be understood by those skilled in the art that the invention as hereinafter claimed may be practiced in support of any type of additional signals employed as part of or in support of buses within any of a wide variety of electronic systems.

Figure 1A:
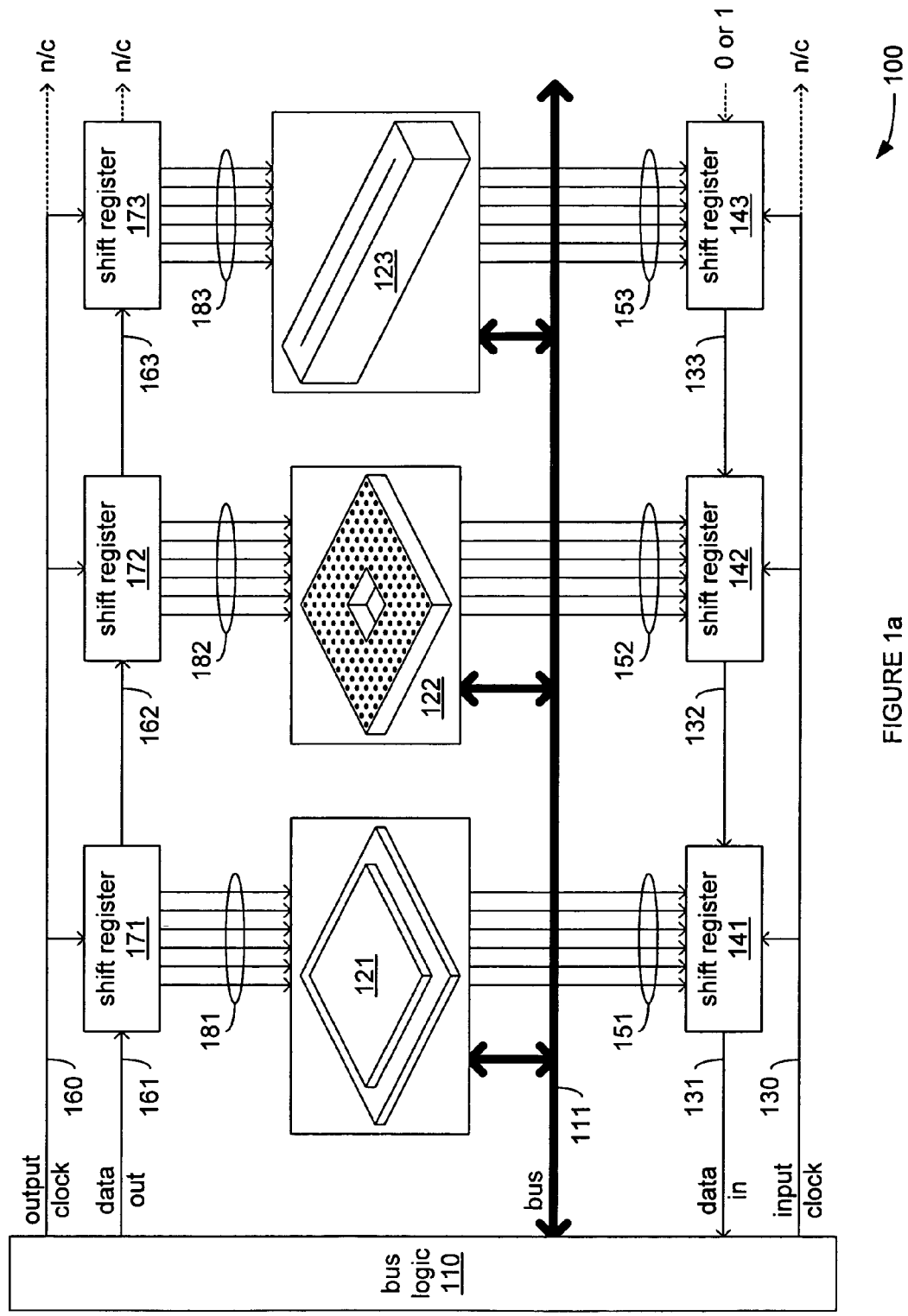
FIGS. 1a, 1b and 1c are block diagrams of embodiments employing buses and non-synchronous bus signals.
Figure 1B:
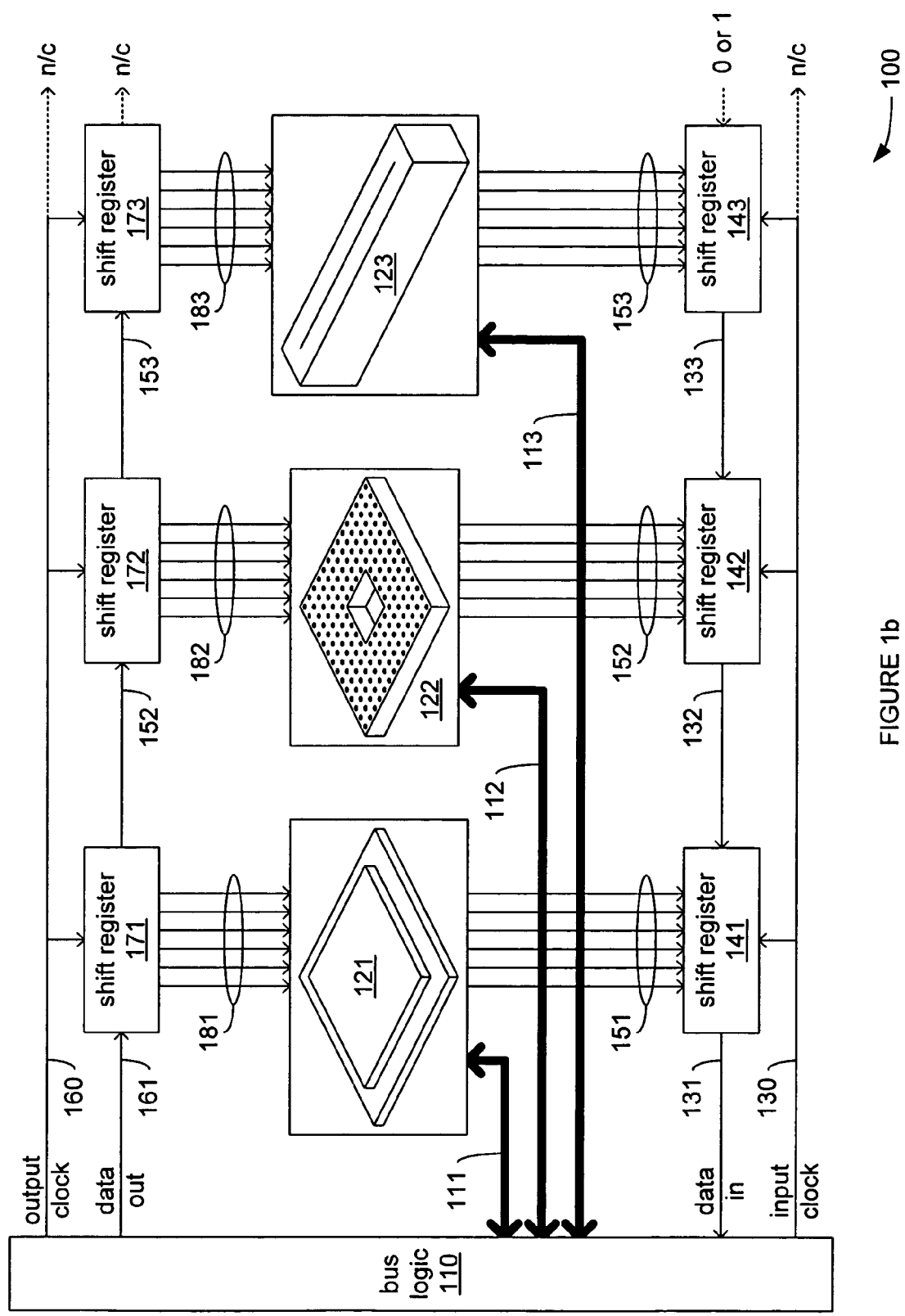
Figure 1C:
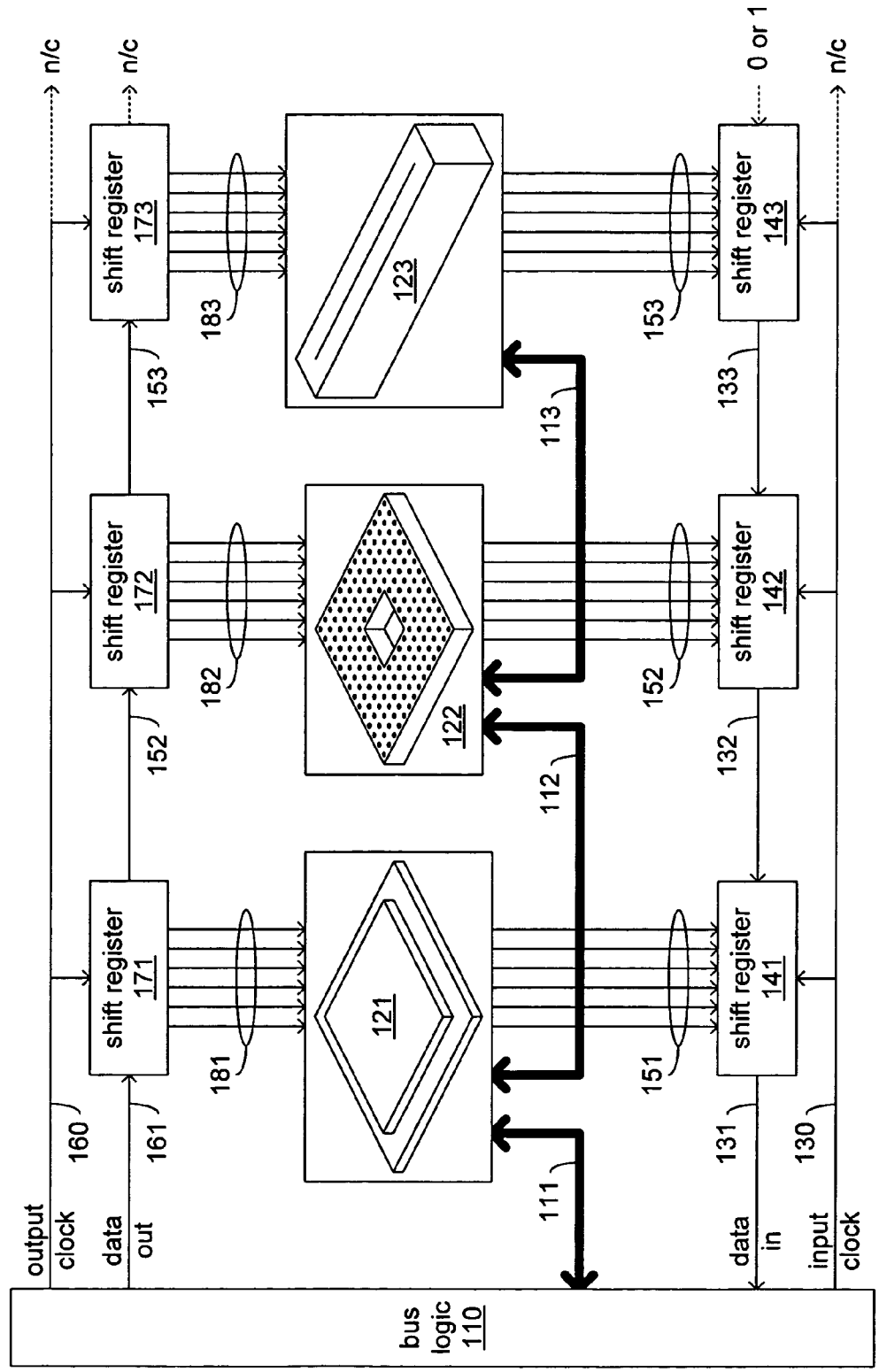

FIGS. 1a, 1b and 1c are simplified block diagrams of possible embodiments employing buses within an electronic system. In all three of FIGS. 1a, 1b and 1c, electronic system 100 is made up, at least in part, of bus logic 110 having one or more bus interfaces coupling bus logic 110 to bus devices 121, 122 and 123 through one or more buses (i.e., bus 111 or buses 111 through 113) controlled to at least some degree by bus logic 110 in various example bus topographies through which addresses, commands and/or data are exchanged between bus logic 110 and bus devices 121-123. FIG. 1a depicts coupling together bus logic 110 and bus devices 121-123 through bus 111, a single multi-drop bus. FIG. 1b depicts individual coupling of bus logic 110 to each of bus devices 121-123 through peer point-to-point buses 111-113, respectively, in a hub-and-spoke topography. FIG. 1c, depicts coupling bus logic 110 and bus devices 121-123 together through a chain of point-to-point buses 111-113, wherein bus logic 110 is coupled to bus device 121 via bus 111, bus device 121 is coupled to bus device 122 via bus 112, and bus device 122 is coupled to bus device 123 via bus 113. These specific depictions of bus topographies in FIGS. 1a-c are provided as examples to facilitate discussion, and as those skilled in the art will readily appreciate, numerous other possible forms of bus or interconnect to exchange addresses, commands and/or data are possible without departing from the spirit and scope of the invention as hereinafter claimed. Beyond these differences in example bus topographies depicted in FIGS. 1a-c, much of the rest of what is depicted in these figures is substantially the same, and therefore, for sake of brevity, the following discussion applies to electronic system 100 within all three of these figures, unless otherwise noted.

In various possible embodiments, electronic system 100 may be a digital electronic appliance such as an audio/visual entertainment console device, a control system of the type commonly used in monitoring and/or controlling an industrial process, a general purpose computer system, or any of a variety of other possible types of electronic system employing bus logic 110 to generate bus 111 (or buses 111-113) to electrically transfer digital information between bus logic 110 and bus devices 121-123. In various possible embodiments, bus logic 110 may be made up of one or more ICs, and may carry out operations on bus 111 (or buses 111-113) to transfer addresses, commands and/or data either in response to commands received from another device coupled to bus logic 110 (not shown), such as a processor, or in support of a processing element within bus logic 110, itself.

In various possible embodiments, bus 111 (or buses 111-113) may be of any of a wide variety of possible architectures with any of a wide variety of possible protocols, signaling methodologies, encoding algorithms, etc. For example, bus 111 (or buses 111-113) may employ single-ended and/or differential signaling in transferring digital information. Also, bus 111 (or buses 111-113) may synchronize at least some transfers to a clock signal and/or may carry out asynchronous transfers coordinated with a handshake protocol. Furthermore, bus 111 (or buses 111-113) may transfer addresses, commands and/or data through parallel sets of digital signal lines and/or may make such transfers through one or more digital serial lines. In various possible embodiments, bus 111 (or buses 111-113) may be designed to conform to any of a number of widely known, publicly available specifications, such as PCI (peripheral component interconnect), PCI-X or PCI-Express (all three of which are standards under the control of the PCI Special Interest Group based in Hillsboro, Oreg.), or such as IEEE-P996 (otherwise known as "industry standard architecture" or ISA, under the control of the IEEE).

As depicted in FIGS. 1a-c, bus device 121 is an integrated circuit, while bus device 122 is an IC socket to which an integrated circuit may be connected, and bus device 123 is a circuitboard connector for the attachment of a circuitboard to which one or more integrated circuits are attached wherein the attachment of a circuitboard to this circuitboard connector will cause the coupling of an integrated circuit to a bus. This depiction of these particular three bus devices is meant only as an example of possible bus devices that may be attached to buses, and should not be taken as limiting the spirit or scope of the invention as hereinafter claimed. More specifically, in various possible embodiments, more than one of bus devices 121-123 may be integrated circuits, sockets or circuitboard connectors. Furthermore, despite the depiction of exactly three of such devices in all of FIGS. 1a-c, those skilled in the art will readily recognize that the invention as claimed may be practiced in support of any quantity of such bus devices, and as will be discussed, may be practiced in support of a quantity of bus devices that may be alterable.

In some embodiments, signals making up bus 111 (or buses 111-113) that are involved in the transfer of addresses, commands and/or data are augmented with additional signals that are operated in a manner that is not necessarily synchronized to such transfers of addresses, commands and/or data. Such non-synchronized signals may provide indications of events and/or coordinate activities that occur at a very different, and perhaps, slower pace or that can otherwise be responded to more slowly than transfers of addresses, commands or data, and therefore, are more amenable to efforts to limit the quantity of I/O signals that must be supported by bus logic 110 through such schemes as employing serial-to-parallel shift registers, such as shift registers 141-143 and 171-173.

In some embodiments, an effort is made to reduce the quantity of output signal lines (such as output signal lines 181, 182 and 183) that must be directly coupled to and driven by bus logic 110 by serializing the high and low states to be driven onto output signal lines 181, 182 and 183, and serially transmitting (or "shifting") those high and low states to shift registers 171, 172 and 173, respectively. More precisely, bus logic 110 is coupled to shift registers 171-173 through a point-to-point chain of serial output lines 161-163 such that bus logic 110 serially transfers the high and low states to be driven onto output signal lines 181-183 to the serial input of shift register 171 through serial output line 161, while shift register 171 relays the high and low states to be driven onto output signals 182-183 to serial input of shift register 172 from the serial output of shift register 171 through serial output line 162, and shift register 172 relays the high and low states to be driven onto output signals 183 to the serial input of shift register 173 from the serial output of shift register 172 through serial output line 163. The parallel outputs of shift registers 171-173 are coupled to output signal lines 181-183, respectively, and upon receiving the high and low states to be driven onto output signal lines 181-183 at the serial inputs of shift registers 171-173, shift registers 171-173 then directly drive those high and low states onto output signal lines 181-183, respectively. In some variations of such embodiments, this serial transmission of the high and low states to be driven onto output signals 181-183 may be synchronized to a clock signal such as output clock signal 160 coupled to the clock inputs of shift registers 171-173.

In some embodiments, an effort is made to reduce the quantity of input signal lines (such as input signal lines 151, 152 and 153) that must be directly coupled to and received by bus logic 110 by employing shift registers 141, 142 and 143 to receive and serialize the high and low states of input signal lines 151, 152 and 153, respectively, and then serially transmitting (or "shifting") those high and low states to bus logic 110. More precisely, the parallel inputs of shift registers 141-143 are coupled to input signals lines 151-153, respectively, such that shift registers 141-143 directly read the high and low states of input signal lines 151-153. Bus logic 110 is coupled to shift registers 141-143 through a point-to-point chain of serial input lines 131-133 such that bus logic 110 serially receives the high and low states of input signal lines 151-153 from the serial output of shift register 141 through serial input line 131, while shift register 141 receives at its serial input the high and low states of input signal lines 152 and 153 relayed to it from the serial output of shift register 142 through serial input line 132, and shift register 142 receives at its serial input the high and low states of input signal lines 153 relayed to it from the serial output of shift register 143 through serial input line 133. In some variations of such embodiments, this serial reception of the high and low states of input signal lines 151-153 by bus logic 110 may be synchronized to a clock signal such as input clock signal 130 coupled to the clock inputs of shift registers 141-143.

In other embodiments, having both input and output signals, a further effort to reduce the overall quantity of I/O signal lines that must be directly coupled to bus logic 110 may be made by having a single common clock signal by which the serial transmission of the high and low states of both input and output signal lines is timed such that both input clock 130 and output clock 160 would be replaced by a single serial clock signal (not shown).

As those skilled in the art will recognize, the actual quantity of such non-synchronized input and/or output signal lines, such as input signal lines 151-153 and output signal lines 181-183, depends largely on the purpose(s) to which such input and output signal lines are applied. In some embodiments, input signal lines that are not synchronized to activities occurring on bus 111 (or buses 111-113) may be employed to allow bus logic 110 to receive interrupt requests, or to monitor the activity or state of a control (such as a switch or button) operated by a person. In some embodiments, output signal lines that are not synchronized to activities on bus 111 (or buses 111-113) may be employed to place a device (such as the IC depicted as bus device 121, an IC coupled to the IC socket depicted as bus device 122, or a circuitboard with at least one attached IC coupled to the circuitboard connector depicted as bus device 123) into a reset state, setup mode or other specific state. In other embodiments, a combination of such non-synchronized input and output signals may be employed to allow a device to arbitrate for or take control of a bus, or may be employed to implement hot-plugging of a device wherein a device might may be connected or disconnected to bus 111 (or one of buses 111-113) without powering down electronic system 100.

For the sake of achieving economies of scale, bus logic 110 is designed to support varying quantities of non-synchronous input and output signals through such serial transfers as have been described so that a single implementation of bus logic 110 may be employed in a variety of different embodiments of electronic system 100. By way of example, a first variation of electronic system 100 may follow the depictions of embodiments in FIGS. 1a-c such that there is a quantity of three bus devices, namely bus devices 121-123, and that for each one of bus devices 121-123, a quantity of six input signal lines and a quantity of six output signal lines are required per bus device. In contrast, a second variation of electronic system 100 may have a larger or smaller quantity of bus devices and/or a larger or smaller quantity of input and/or output signal lines required per bus device, such that this second variation of electronic system 100 (not shown) requires many more shift registers than the three shift registers depicted for both the input signal lines and the output signal lines (or requires shift registers with many more bit positions supporting many more parallel inputs and/or outputs). In being designed for use in either of these two example variations of electronic system 100, bus logic 110 internally possesses a quantity of shift registers (or a single shift register with a quantity of bit positions) necessary to support the larger total quantity of input and output signal lines required by the second variation of electronic device 100, but bus logic 110 serially transmits the high and low states of output signal lines and serially receives the high and low states of input signal lines in an order that makes possible the supporting of such differing quantities of both input and output signal lines with a relatively simple circuit design within bus logic 110 that need not be altered or reprogrammed to accommodate such differing quantities. The manner in which this is accomplished will be more fully discussed with reference to FIGS. 2a and 2b.

FIGS. 2a and 2b are simplified block diagrams of two contrasting embodiments transmitting and receiving non-synchronous signals, one supporting a greater quantity of non-synchronized input and/or output signal lines than the other, and providing a closer look at the manner in which such differing quantities of input and output signals are accommodated. In a manner not unlike electronic system 100 of FIGS. 1a-c, electronic system 200 in both FIGS. 2a-b is made up, at least in part, of bus logic 210, bus devices 221-223 (or 221-226) coupled by a bus or buses to bus logic 210, non-synchronized input and output signal lines 251-253 and 281-283 (or 251-256 and 281-286), and shift registers 241-243 and 271-273 (or 241-246 and 271-276) to convey high and low states of those non-synchronized input and output signal lines between the bus devices and bus logic 210 through a serial transfer of high and low states that is not necessarily synchronized to activity occurring on the bus or buses. Though these similarities between electronic systems 100 and 200 exist, the depiction of electronic system 200 in FIGS. 2a-b differs from the depiction of electronic system 100 in FIGS. 1a-c, in that for the sake of clarity of the discussion to follow, the bus/buses and the clock signals for timing serial transfers that were explicitly depicted in FIGS. 1a-c are not depicted in FIGS. 2a-b (though they may be present), and shift registers employed by bus logic 210 to engage in serial transfers are explicitly depicted (namely, shift registers 215 and 216). Also, while FIGS. 1a-c were meant to depict embodiments with differing bus topographies, FIGS. 2a-b are meant to depict embodiments with differing quantities of bus devices coupled to bus logic 210, namely bus devices 221-223 in FIG. 2a and bus devices 221-226 in FIG. 2b.

Not unlike electronic system 100, electronic system 200 may be any of a variety of possible types of electronic system employing bus logic 210 to generate a bus or buses to electrically transfer digital information between bus logic 210 and bus devices 221-223 (or 221-226), and bus logic 210 may be made up of one or more ICs that carry out bus operations to transfer addresses, commands and/or data either in response to commands received from another device coupled to bus logic 210 (not shown), such as a processor, or in support of a processing element within bus logic 210, itself. Also, the bus or buses coupling bus logic 210 to bus devices 221-223 (or 221-226) may be of any of a variety of topologies, including those depicted in FIGS. 1a-c, and the bus or buses may be of any of a wide variety of possible architectures with any of a wide variety of possible protocols, signaling methodologies, encoding algorithms, etc. Furthermore, bus devices 221-223 (or 221-226) may of any of a wide variety of possible bus devices capable of being coupled to a bus across which addresses, commands and/or data are transferred, including ICs, IC sockets to enable the coupling of an IC to a bus, and circuitboard connectors to enable the coupling of one or more ICs attached to a circuitboard to a bus.

In a manner substantially similar to what was discussed with reference to electronic system 100 of FIGS. 1a-c, in some embodiments of electronic system 200, an effort is made to reduce the number of output signal lines that must be directly coupled to and driven by bus logic 210 by serializing the high and low states to be driven onto those output signal lines, and serially transmitting those high and low states to one or more shift registers outside bus logic 210. More precisely, bus logic 210 is coupled to shift registers 271-273 (or 271-276) through a chain of point-to-point connections in the same manner as was described with regard to shift registers 171-173 such that bus logic 210 is able to serially transfer the high and low states to be driven onto output signal lines 281-283 (or 281-286) to shift registers 271-273 (or 271-276) in the same manner as was described with regard to shift registers 171-173. Also, the parallel outputs of shift registers 271-273 (or 271-276) are able to drive those high and low states received from bus logic 210 onto output signal lines 281-283 (or 281-286) in the same manner as was described with regard to output signal lines 181-183, thereby allowing those high and low states to be conveyed on those signal lines to bus devices 221-223 (or 221-226), respectively.

Also in a manner substantially similar to what was discussed with reference to electronic system 100, in some embodiments of electronic system 200, an effort is made to reduce the number of input signal lines that must be directly coupled to and received by bus logic 210 by receiving and serializing the high and low states of those input signal lines, and serially transmitting those high and low states to bus logic 210 using one or more shift registers outside bus logic 210. More precisely, the parallel inputs of shift registers 241-243 (or 241-246) are coupled to and able to receive the high and low states from input signal lines 251-253 (or 251-256) that are driven onto those signal lines by bus devices 221-223 (or 221-226), respectively, in the same manner as was described regarding input signal lines 151-153. Also, bus logic 210 is coupled to shift registers 241-243 (or 241-246) through a chain of point-to-point connections in the same manner as was described with regard to shift registers 141-143 such that shift registers 241-243 (or 241-246) are able to serially transfer the high and low states received from input signal lines 251-253 to bus logic 210, also in the same manner as was described with regard to shift registers 141-143.

As previously mentioned, FIGS. 2a and 2b depict contrasting quantities of bus devices coupled to bus logic 210. For the sake of achieving economies of scale, bus logic 210 is designed to support differing quantities of non-synchronous input and output signals through such serial transfers as have been described so that a single implementation of bus logic 210 may be coupled to differing numbers of bus devices, such as the quantity of three bus devices depicted in FIG. 2a and the quantity of six bus devices depicted in FIG. 2b, where as depicted, all of the bus devices are each to be coupled to six input signal lines and six output signal lines. To accommodate differing quantities of bus devices and/or differing quantities of input and/or output signal lines, bus logic 210 is made up, at least in part, of shift registers 215 and/or 216. In some embodiments, shift register 215 is designed to have a quantity of bit positions chosen to be large enough to accommodate the larger quantity of output signal lines required of the two embodiments of electronic system 200 depicted in FIGS. 2a and 2b. Similarly, in some embodiments, shift register 216 is designed with a quantity of bit positions chosen to be larger enough to also handle the larger of the two quantities of input signal lines depicted in FIGS. 2a and 2b.

In an effort both to enable the use of a single design for shift registers 215 and 216, and to avoid requiring the use of more shift registers than necessary outside of bus logic 210 to support any given number of bus devices, shift registers 215 and 216 are designed to serially transmit and serially receive high and low states of output and input signal lines with a particular ordering of the bits representing those high and low states. More particularly, the bits representing high and low states of both the input and output signal lines are grouped together within shift registers 216 and 215, respectively, such that bits representing high and low states of input and output signal lines for each bus device occupy adjacent positions within shift registers 216 and 215. Furthermore, an allocation of bits is implemented in shift register 215 that results in bits corresponding to output signal lines that are actually implemented (i.e., those that actually exist) being transmitted last when the bits of shift register 215 that represent the high and low states to be driven onto outputs signal lines are serially transmitted. Similarly, an allocation of bits is implemented in shift register 216 that results in bits corresponding to input signal lines that are actually implemented (actually exist) being received first when the bits that represent the high and low states of input signal lines are serially received.

The advantages of this ordering of bits is best understood through a comparison of the allocation of bits in shift registers 215 and 216 between FIGS. 2a and 2b. In FIG. 2b, all of the 36 bits within shift registers 215 and 216 are allocated, because with a quantity of six bus devices (namely bus devices 221-226) coupled to bus logic 210 that each require a quantity of six input and a quantity of six output signal lines (namely input signal lines 251-256 and output signal lines 281-286) and their corresponding shift registers to support all of those input and output signal lines (namely shift registers 241-246 and 271-276), a total of 36 input signal lines and 36 output signal lines are required. Therefore, whenever the contents of shift register 215 are transmitted, or whenever shift register 216 is filled with newly received contents, all of the bits within both shift registers 215 and 216 correspond to a signal line that has actually been implemented.

However, in FIG. 2a, there is a quantity of only three bus devices (namely bus devices 221-223) coupled to bus logic 210 that each require a quantity of six input and a quantity of six output signal lines (namely input signal lines 251-253 and output signal lines 281-283) and their corresponding shift registers (namely shift registers 241-243 and 271-273), and so, only 18 input signal lines and 18 output signal lines are actually implemented, and as a result, only 18 of the 36 bits within each of shift registers 215 and 216 correspond to signal lines that have actually been implemented, and therefore, only 18 of the 36 bits within each of shift registers 215 and 216 are actually required and actually used in transferring bit values representing high and low states.

It should be noted, and as those skilled in the art will readily recognize, the depictions of distinct separate shift registers corresponding to each bus device depicted in FIGS. 2a and 2b are made for the sake of simplicity of discussion in this text and should be taken as merely two examples of the great many possible configurations of shift registers that may be resorted to without departing from the spirit and scope of the invention as hereinafter claimed. More specifically, and by way of example in some possible embodiments, more than one of shift registers 271-273 (or 271-276) or more than one of shift registers 241-243 (or 241-246) may be combined into a single larger shift register able to support more than one of bus devices 221-223 (or 221-226). Indeed, as those skilled in the art will readily recognize, programmable logic devices may be employed to fill the role of more than one of the depicted shift registers and support more than one of the depicted bus devices.

Within shift register 215, the 18 bits corresponding to output signal lines that have actually been implemented (i.e., output signal lines 281-283) are grouped together towards one end of shift register 215 such that these 18 bits are always the last bits to be transmitted by shift register 215 in a serial transmission from shift registers 215 to shift registers 271-273. As depicted in FIG. 2a, the serial output of shift register 273 is coupled to nothing (i.e., it is a "no-connect"), and when all 36 bit values within shift register 215 are transmitted, the first 18 bits to be transmitted that are the ones that do not correspond to any implemented output signal lines are simply relayed through all three of shift registers 271-273 and out through the unconnected serial output of shift register 273, and are thereby discarded. By transmitting bits representing the high and low states to be driven onto output signal lines that have actually been implemented last, a need either to provide shift registers to receive bits not corresponding to any implemented output signal line, or to add complexity to the design of shift register 215 to allow the number of bits transferred in each serial transfer to be varied through some additional mechanism, is eliminated. In other words, were the 18 bits corresponding to output signal lines 281-283 allocated towards the other end of shift register 215 such that they were transmitted first in a serial transmission of the contents of shift register 215, then either there would have to be additional shift registers put in place between shift registers 215 and 271 to receive other bits corresponding to output signal lines that have not been implemented, or additional circuitry would have to be added to the design of shift register 215 such that the quantity of bits to be transmitted may be varied so that only a quantity of bits sufficient to transmit the 18 bits that correspond to output signal lines 281-283 would be transmitted by shift register 215. So, by allocating the bits of shift register 215 such that the 18 bits corresponding to output signal lines 281-283 such that those 18 bits are transmitted last, the design of shift register 215 can be made simpler such that shift register 215 always transmits all 36 of its bits when the serial transmission of its contents takes place, and only a quantity of shift registers outside bus logic 210 that is sufficient to implement all of output signal lines 281-283 (i.e., shift registers 271-273) need be provided, and these two benefits help to reduce both circuit complexity and costs.

Within shift register 216, the 18 bits corresponding to input signal lines that have actually been implemented (i.e., input signal lines 251-253) are grouped together towards one end of shift register 216 such that these 18 bits are always the first to be received by shift register 216 in a serial transmission from shift registers 241-243 to shift register 216. As depicted in FIG. 2a, the serial input of shift register 243 is tied through resistor 249 to either a high or low voltage level such that each bit "received" by shift register 243 during serial shifting through that serial input will always be high or low, and when all 36 bit positions within shift register 216 are filled through the serial transmission of 36 bits through shift registers 241-243, the first 18 bits received by shift register 216 will always represent the high and low states of input signal lines 251-253, while the latter 18 bits received by shift register 216 will all represent either a high or low state depending on whether that serial input of shift register 243 is tied high or low. By receiving bits representing the high and low states of input signal lines that have actually been implemented first, a need either to provide shift registers to transmit bits not corresponding to any implemented input signal line, or to add complexity to the design of shift register 216 to allow the number of bits received in each serial transfer to be variable, is eliminated. In other words, were the 18 bits corresponding to input signal lines 251-253 allocated towards the other end of shift register 216 such that they were received last in a serial transmission of the states of input signal lines 251-253 into shift register 216, then either there would have to be additional shift registers put in place between shift registers 241 and 216 to transmit other bits corresponding to input signal lines that have not been implemented, or additional circuitry would have to be added to the design of shift register 216 such that the quantity of bits to be received may be varied so that only a quantity of bits sufficient to receive the 18 bits that correspond to input signal lines 251-253 would be received by shift register 216. So, by allocating the bits of shift registers 216 such that the 18 bits corresponding to input signal lines 251-253 such that those 18 bits are received first, the design of shift register 216 can be made simpler such that shift register 216 always receives a quantity of 36 bits to fill all of its 36 bit positions when the serial reception of the state of input signal lines 251-253 takes place, and only a quantity of shift registers outside bus logic 210 that is sufficient to implement all of output signal lines 251-253 (i.e., shift registers 241-243) need be provided, and again, these two benefits help to reduce both circuit complexity and cost.

Figure 3A:
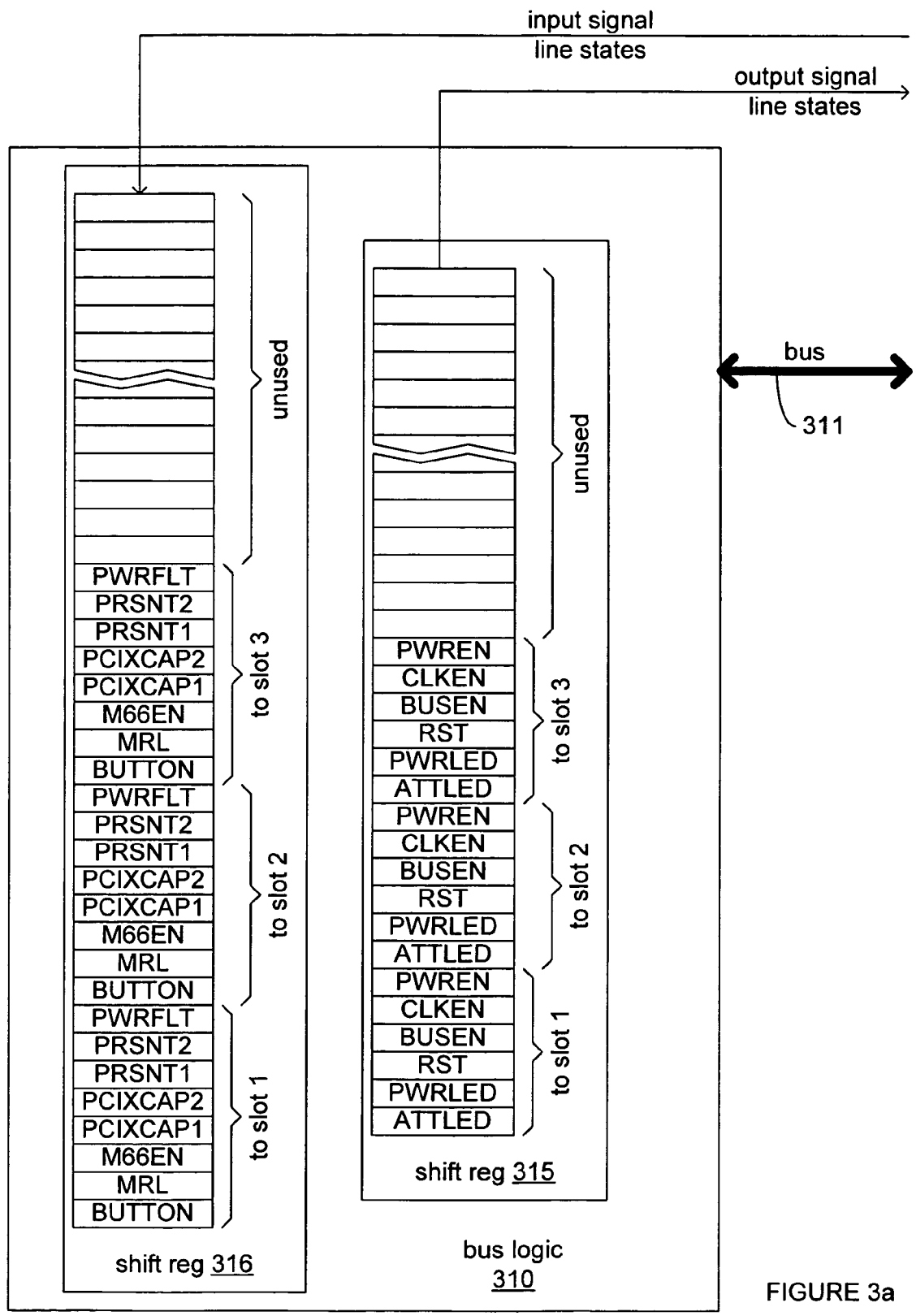
FIGS. 3a and 3b, taken together, are a block diagrams of embodiments non-synchronous signals for hot-plugging.
Figure 3B:
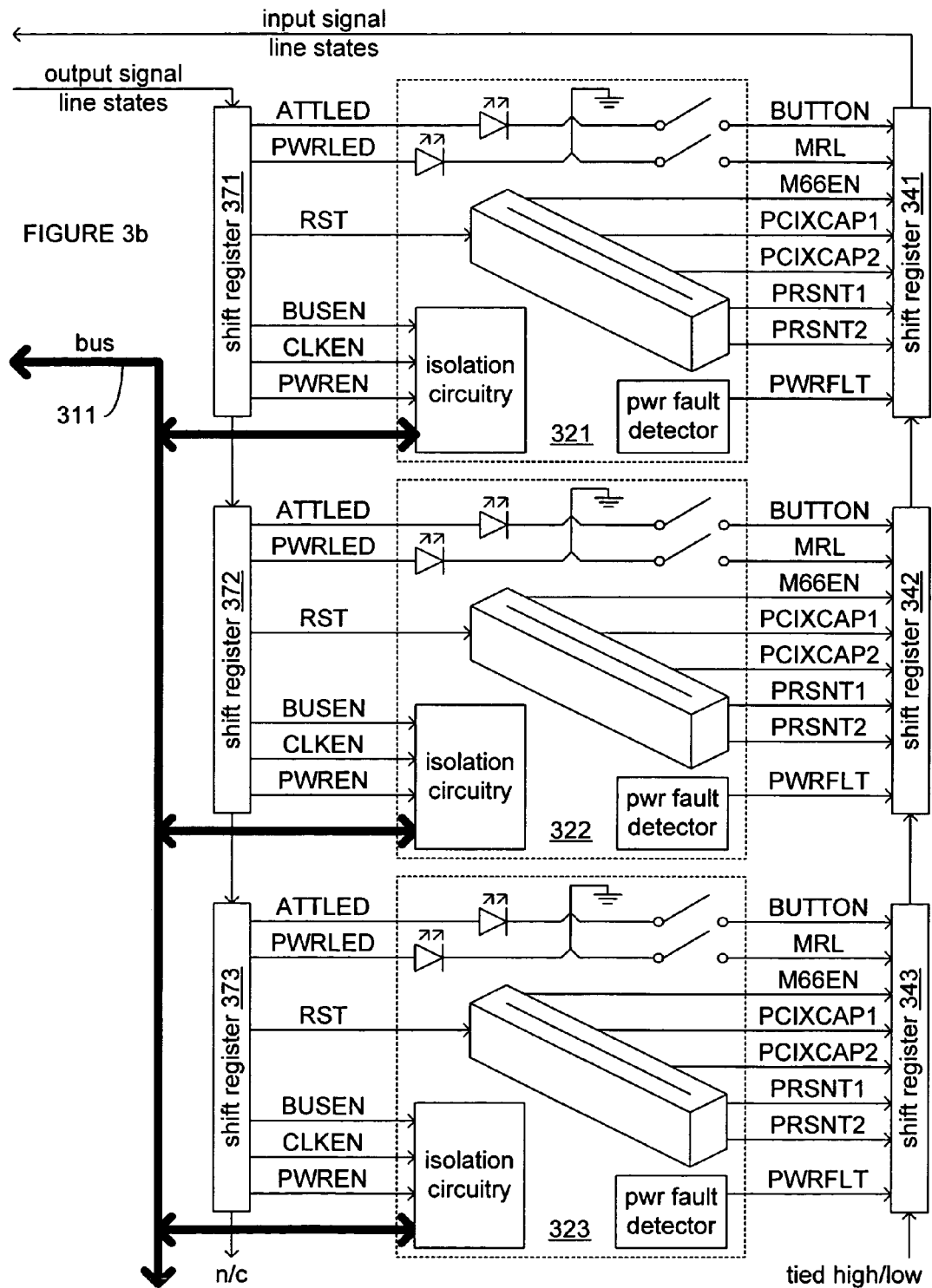

FIGS. 3a and 3b, taken together, are a block diagram of embodiments transmitting and receiving non-synchronous signals to support the hot-plugging of bus devices to a bus. In a manner not unlike electronic system 100 of FIGS. 1a-c and electronic system 200 of FIGS. 2a-b, electronic system 300 of FIGS. 3a and 3b, is made up, at least in part, of bus logic 310, bus devices 321-323 coupled by bus 311 to bus logic 310, and shift registers 341-343 and 371-373, along with shift registers 315 and 316 within bus logic 310 to convey high and low states of non-synchronized input and output signal lines between bus devices 321-323 and bus logic 310 through serialized transfers of those high and low states, where those serialized transfers are not necessarily synchronized to activity occurring on bus 311. Though these similarities between electronic system 300 and both electronic systems 100 and 200 exist, the depiction of electronic system 300 differs from the depiction of either of electronic systems 100 and 200, in that the depiction of electronic system 300 is meant to focus more on the serialized transfer of signals employed in support of hot-plugging.

Not unlike electronic systems 100 and 200, electronic system 300 may be any of a variety of possible types of electronic system employing bus logic 310 to generate a bus or buses to electrically transfer digital information between bus logic 310 and bus devices 321-323, and bus logic 310 may be made up of one or more ICs that carry out bus operations to transfer addresses, commands and/or data either in response to commands received from another device coupled to bus logic 310 (not shown), such as a processor, or in support of a processing element within bus logic 310, itself. Also, although a single bus is depicted as coupling all of bus devices 321-323 to bus logic 310 (namely bus 311), it will be understood by those skilled in the art that differing quantities, types and topographies of buses may be used to couple together bus logic 310 and bus devices 321-323, including the possible topographies depicted in FIGS. 1a-c. Furthermore, bus devices 321-323 may of any of a wide variety of possible bus devices capable of being coupled to a bus across which addresses, commands and/or data are transferred. However, both to provide an example and to facilitate the discussion to follow in which hot-plugging is discussed in some detail, in FIGS. 3a-b, bus devices 321-323 are each depicted as a combination of at least one connector and circuitry to support the hot-plugging of other devices (not shown) to permit such other devices to be coupled to and uncoupled from bus 311 without powering down electronic system 300.

In a manner substantially similar to what was discussed with reference to electronic system 100 of FIGS. 1a-c, and electronic system 200 of FIGS. 2a-b, in some embodiments of electronic system 300, an effort is made to reduce the number of output signal lines that must be directly coupled to and driven by bus logic 310 by serializing the high and low states to be driven onto those output signal lines in shift register 315 within bus logic 310, serially transmitting those high and low states from shift register 315 to shift registers 371-373, and employing the parallel outputs of shift registers 371-373 to drive those high and low states onto output signal lines in the same manner as was described with regard to shift registers 171-173, 215 and 271-273 (or 271-276). Also in a manner substantially similar to what was discussed with reference to electronic systems 100 and 200, in some embodiments of electronic system 300, an effort is made to reduce the number of input signal lines that must be directly coupled to and received by bus logic 310 by receiving and serializing the high and low states of input signal lines employing the parallel inputs of shift registers 341-343, serially transmitting those high and low states from shift registers 341-343 to shift register 316 within bus logic 310 in the same manner as was described with regard to shift registers 141-143, 216 and 241-243 (or 241-246).

As previously mentioned, FIGS. 3a-3b, taken together, depict embodiments transmitting and receiving non-synchronous signals to support the hot-plugging of bus devices to a bus. More precisely, each of bus devices 321-323 is at least partly made up of a connector coupled to bus 311 and to which another device (not shown) may be attached to couple that other device to bus 311. Each of bus devices 321-323 may, in some embodiments, be further made up of isolation circuitry interposed between the connector to which that other device may be attached and bus 311 to selectively provide electrical isolation on occasions when that other device is being attached to or detached from the connector. Furthermore, each of bus devices 321-323 may, depending the exact protocol and procedures used in attaching another device to the connector or detaching another device from the connector, be further made up of one or more indicators (such as LEDs), switches and/or sensors (such as a power fault detector). Output signal lines, such as those coupled to the parallel outputs of shift registers 371-373, may be needed to control whatever forms of isolation circuitry and/or indicators. Similarly, input signal lines, such as those coupled to the parallel inputs of shift registers 341-343, may be needed to receive indications of the state of attachment or detachment of another device to the connector, the state of one or more switches, and/or indications of one or more possible conditions provided by one or more sensors.

In some embodiments, the exact choice of isolation circuitry, indicators, switches, sensors, etc., and therefore, the quantity of input and/or output signal lines that may be amenable to being serially transmitted and/or received by bus logic 310, may be at least partially determined by one or more industry standards to which a given implementation of hot-plugging in a given embodiment of electronic system 300. More precisely, in various possible embodiments, hot-plugging may be implemented with protocols, timings, etc., that may be designed to conform to any of a number of widely known, publicly available specifications, such as PCI, PCI-X, PCI-Express and/or the PCI Standard Hot-Plug Controller and Subsystem Specification (SHPC), all four of which are standards under the control of the PCI Special Interest Group based in Hillsboro, Oreg.

In one embodiment having three bus devices that provide support for hot-plugging, namely bus devices 321-323, hot-plugging is implemented in a form meant to conform with one or both of the PCI-X and PCI-Express specifications such that a quantity of perhaps six output signal lines and perhaps eight input signal lines may be employed per bus device. Among the output signal lines to which bus logic 310 serially transmits high and low states, are an attention LED output (ATTLED), power LED output (PWRLED), reset output (RST), bus enable output (BUSEN), clock enable output (CLKEN), and power enable output (PWREN). Also, among the input signal lines to from which bus logic 310 serially receives high and low states, are an attention button input (BUTTON), manual retention latch input (MRL), 66 MHz clock enable input (M66EN), PCI-X capabilities inputs 1 and 2 (PCIXCAP1 and PCIXCAP2), presence detect inputs 1 and 2 (PRSNT1 and PRSNT2), and power fault input (PWRFLT). ATTLED and PWRLED drive LEDs (or other indicators) to inform a user of a problem or failure in hot-plugging, and whether or not a given one of bus devices 321-323 is currently being supplied with power, respectively. RST provides an individual reset signal to a given one of bus devices 321-323. BUSEN, CLKEN and PWREN provide control inputs to isolation circuitry within a given one of bus devices 321-323 to selectively control the provision of bus signals, clock signals and power, respectively, to a device attached to the connector of the given one of bus devices 321-323. BUTTON and MRL convey the current state of the attention button and manual retention latch, respectively, for a given one of bus devices 321-323. If a given one of bus devices 321-323 provides support for at least some of the functionality of the PCI-X specification, then M66EN receives an indication of whether or not a device attached to the connector of a given one of bus devices 321-323 has a bus interface capable of being driven at a 66 MHz clock rate, and PCIXCAP1 and PCIXCAP2 receive indications of other capabilities of the device attached to the connector. PRSNT1 and PRSNT2 receive indications that a device attached to the connector of a given one of bus devices 321-323 is properly attached to the connector so as to form a reliable coupling between the device and the connector and/or receive indications as to the amount of power that a device attached to the connector of a given one of bus devices 321-323 requires. PWRFLT receives an indication from a power fault detector within a given one of bus devices 321-323 that some form of trouble has been detected in providing power to a device attached to the connector of the given one of bus devices 321-323, such as a short-circuit or overload condition.

Given that the procedures involved in attaching and detaching a device to the connector of a given one of bus devices 321-323 are initiated by a user of electronic system 300, and therefore, are timed more at a human pace rather than synchronized to the presumably much faster activity occurring on bus 311, the comparatively slow pace of the activity likely to occur on the input and output signals lines coupling shift registers 341-343 and 371-373, respectively, to each of bus devices 321-323 may make these input and output signal lines more amenable than others to the form of serialized transfers discussed herein. Like bus logic 210 of electronic system 200, bus logic 310 is designed to be employed in various different possible implementations of electronic system 300 that differ in the quantity of bus devices implementing hot-plugging, and to achieve economies of scale of the manufacture of bus logic 310, shift registers 315 and 316 (like shift registers 215 and 216) are designed to have a quantity of bit positions large enough to accommodate larger quantities of bus devices implementing hot-plugging such that the presence of three of such bus devices in the depicted form of electronic system 300 is not a number of bus devices large enough for all the bit positions of both shift registers 315 and 316 to be used.

Furthermore, like electronic system 200 and bus logic 210, reductions in both costs and in the complexity of the design are achieved by allocating the available bits within shift registers 315 and 316 in such a way as to minimize the number shift registers needed externally of bus logic 310 and to avoid the need to provide control logic to alter the number of bit positions shifted in serial transfers involving shift registers 315 and 316. To do this, bits corresponding to PWREN, CLKEN, BUSEN, RST, PWRLED and ATTLED are positioned to form groups of adjacent bits for each one of bus devices 321-323, and each of these groups of adjacent bits are, themselves, positioned adjacent to each other, and are positioned at one end of shift register 315 so as to cause these bits to be transmitted last when the bit values of all of the bits of shift register 315 are transmitted to shift registers 371-373. Similarly, bits corresponding to BUTTON, MRL, PWRFLT, PRSNT1, PRSNT2, M66EN, PCIXCAP1 and PCIXCAP2 are also positioned to form groups of adjacent bits corresponding to each one bus devices 321-323, with the groups of adjacent bits, themselves, being positioned at one end of shift register 316 so as to cause bit values to fill these bits within shift register 316 to be received last when bit values are received from shift registers 341-343.

Figure 4:
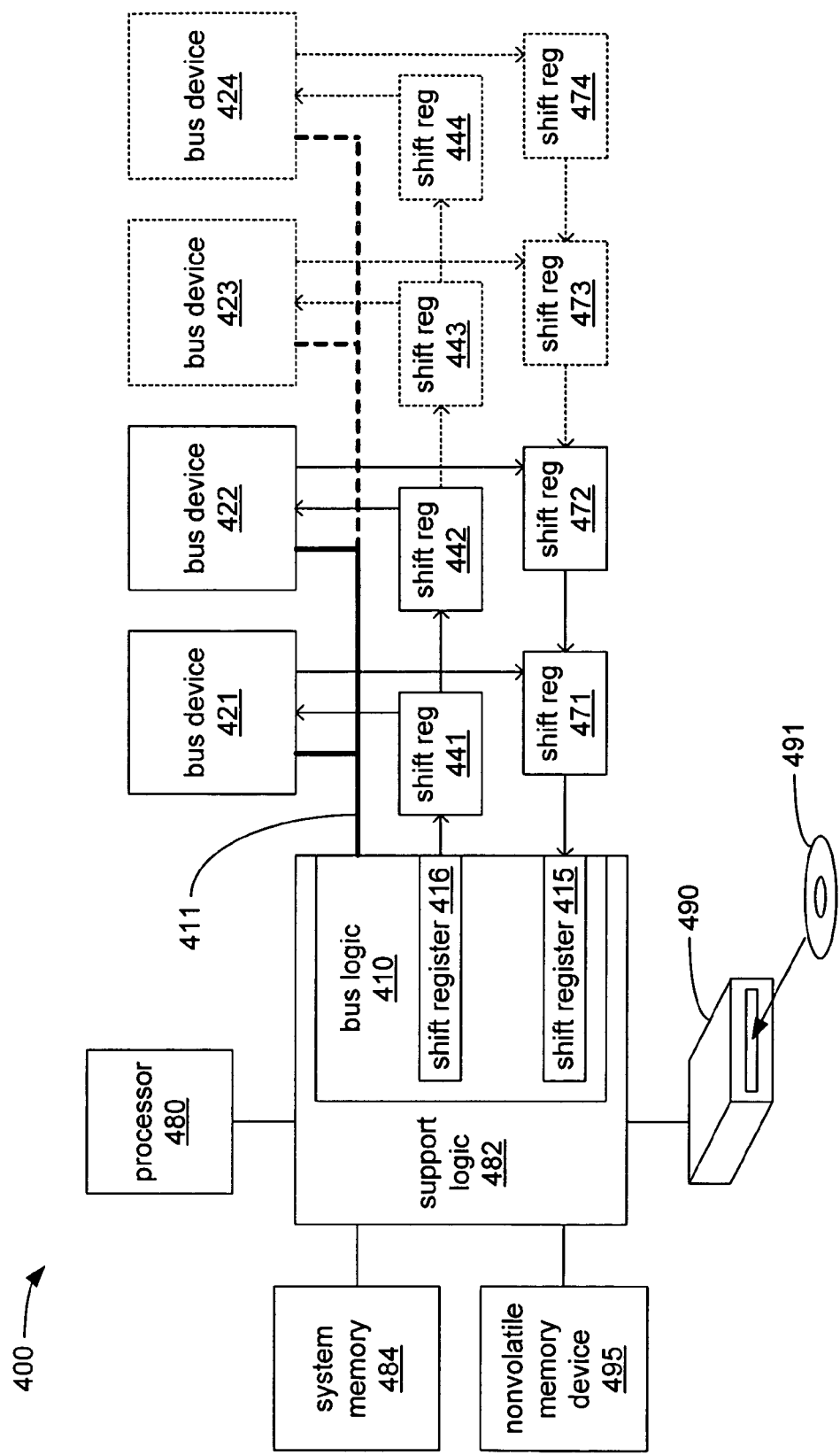
FIG. 4 is a block diagram of an embodiment employing a computer system.

FIG. 4 is a block diagram of an embodiment employing a computer system. Electronic system may be any of a number of types of systems employing some form of processor, including a computer system. Electronic system 400 is, at least in part, made up of processor 480, support logic 482, and system memory 484, which together, make up a form of core of processing and storage components capable of storing, retrieving and executing instructions. Electronic system 400 is further made up of bus logic 410 to interface support logic 482 to bus 411, and through bus 411 to one or more bus devices, including bus devices 421 and 422, and possibly, as hinted by dotted lines, additional bus devices 423 and 424. As will be explained in more detail, bus logic 410 is designed for flexibility by having the capability to support differing numbers of bus devices to allow bus logic 410 to be employed in a wider variety of differing forms of electronic system 400 having differing quantities of bus devices.

In some embodiments, bus controller 410 is but a portion of the circuitry making up a larger IC, such as support logic 482 that is coupled to processor 480 to provide various processor support functions (e.g., by providing timers, I/O interfaces, DMA controllers, interrupt controllers, etc.), as depicted. In other embodiments, bus controller 410 may be incorporated within a processing device, such as a processor 480. In still other embodiments, bus controller 410 is an entirely separate IC carrying out bus operations in response to commands received from another device coupled to bus controller 410. In various embodiments, processor 480 could be any of a variety of types of processor including a processor capable of executing at least a portion of the widely known and used "x86" instruction set, and in other various embodiments, there could be more than one processor. Furthermore, processor 480 may possess more than one distinct processor core, or multiple portions of processor cores capable of operating substantially in parallel relative to each other, such that processor 480 is able to execute multiple independent sets of machine-readable instructions in parallel.

In some embodiments, processor 480 may have access to either nonvolatile memory device 495 (such as an EEPROM, ROM, FLASH, etc.) or media 491 (such as a floppy diskette, CD-ROM, tape, etc.) employed by storage device 490, either through support logic 482 or through some other coupling, by which processor 480 may retrieve a set of instructions. In various embodiments, system memory could be made up of one or more memory devices of any of a variety of types of DRAM including (but not limited to) fast page mode (FPM), extended data out (EDO), single data rate (SDR) or double data rate (DDR) forms of synchronous dynamic RAM (SDRAM), RAM of various technologies employing a RAM-BUS™ interface, etc.

In a manner substantially similar to what was discussed with reference to electronic systems 100, 200 and 300, above, in some embodiments of electronic system 400, an effort is made to reduce the number of output signal lines that must be directly coupled to and driven by bus logic 410 (and correspondingly, reduce the number of direct outputs) by serializing the high and low states to be driven onto those output signal lines in shift register 415 within bus logic 410, serially transmitting those high and low states from shift register 415 to shift registers 471-472 (or 471-474), and employing the parallel outputs of shift registers 471-472 (or 471-474) to drive those high and low states onto output signal lines in the same manner as was described with regard to shift registers 171-173, 215 and 271-273 (or 271-276), to provide signals to corresponding ones of bus devices 421-422 (or 421-424). Also in a manner substantially similar to what was discussed with reference to electronic systems 100, 200 and 300, in some embodiments of electronic system 400, an effort is made to reduce the number of input signal lines that must be directly coupled to and received by bus logic 410 by receiving and serializing the high and low states of input signal lines employing the parallel inputs of shift registers 441-442 (or 441-444), serially transmitting those high and low states from shift registers 441-442 (or 441-444) to shift register 416 within bus logic 410 in the same manner as was described with regard to shift registers 141-143, 216 and 241-243 (or 241-246).

Furthermore, like the electronic systems discussed, above, reductions in both costs and in the complexity of the design are achieved by allocating the available bits within shift registers 415 and 416 in such a way as to minimize the number shift registers needed externally of bus logic 410 and to avoid the need to provide control logic to alter the number of bit positions shifted in serial transfers involving shift registers 415 and 416. This is done by allocate the bit positions within shift registers 415 and 416 in a manner substantially similar to what was previously describe with regard to shift register 215 and 216, and with regard to shift registers 315 and 316.

The invention has been described in some detail with regard to various possible embodiments. It is evident that numerous alternatives, modifications, variations and uses will be apparent to those skilled in the art in light of the foregoing description. It will be understood by those skilled in the art that the present invention may be practiced in support of many possible types of memory devices employing any of a number of possible memory technologies. It will also be understood by those skilled in the art that the present invention may be practiced in support of electronic devices other than computer systems such as audio/video entertainment devices, controller devices in vehicles, appliances controlled by electronic circuitry, etc.

What is claimed is:

1. An apparatus comprising:
   a plurality of bus devices, each bus device coupled to a first bus and to a corresponding one of a plurality of sets of output signal lines to receive signals therefrom, the signals independent of and unsynchronized to the first bus;
   a plurality of first shift registers, each coupled to at least one other first shift register by a point-to-point interconnect, and each to provide the corresponding signals to the set of output signal lines coupled to the corresponding bus device;
   the first bus coupled to each of the plurality of bus devices; and
   bus logic having a first bus interface coupled to the first bus and having an output shift register coupled to a first one of the plurality of first shift registers to transmit bit values unsynchronized to activity on the first bus, the output shift register having a plurality of bit positions to store bit values of states to be driven onto the sets of output signal lines, and when a number of the plurality of bus devices is less than a supported number of bus devices for the bus logic, the bit values of the bit positions for the plurality of bus devices are the last bit values to be transmitted from the output shift register.

2. The apparatus of claim 1, wherein each of the plurality of first shift registers is coupled to a single one of the plurality of bus devices.

3. The apparatus of claim 1, further comprising a plurality of second shift registers, each coupled to at least one other second shift register by a point-to-point interconnect, and each to receive information signals from one of a set of input signal lines from a corresponding one of the plurality of bus devices, the information signals independent of and unsynchronized to the first bus, the plurality of second shift registers separate from the plurality of first shift registers and adapted on a side of the corresponding bus device opposite from the corresponding first shift register.

4. The apparatus of claim 3, wherein the bus logic further comprises an input shift register coupled to a first one of the second shift registers to receive bit values unsynchronized to activity on the first bus.

5. The apparatus of claim 4, wherein the bus logic is to receive a number of the bit values corresponding to the supported number of bus devices even when the number of the plurality of bus devices is less than the supported number of bus devices.

6. The apparatus of claim 3, wherein the signals and the information signals are commonly clocked.

7. The apparatus of claim 1, wherein one of the plurality of bus devices comprises:
   a connector for hot-plugging another device; and
   isolation circuitry coupled to the first bus, the connector, and at least one output signal line of the corresponding set of output signal lines to electrically isolate at least a portion of the connector from at least a subset of signal lines of the first bus in response to a state driven onto the at least one output signal line by the corresponding-first shift register to enable hot-plugging the other device.

8. The apparatus of claim 1, wherein one of the plurality of bus devices comprises an indicator coupled to at least one of the corresponding set of output signal lines to provide a user an indication of a state of the bus device.

9. The apparatus of claim 1, wherein at least one output signal line of the corresponding set of output signal lines is to communicate a signal to one of the plurality of bus devices to place the bus device into a predetermined state.

10. The apparatus of claim 1, wherein the bus logic is to transmit all of the plurality of bit positions even when the number of the plurality of bus devices is less than the supported number of bus devices.

11. The apparatus of claim 1, wherein each of the plurality of first shift registers is a programmable logic device.

12. An apparatus comprising:
a plurality of bus devices, each bus device coupled to a first bus and to a corresponding one of a plurality of sets of output signal lines to receive signals therefrom, the signals independent of and unsynchronized to the first bus;
a plurality of first shift registers, each coupled to at least one other first shift register by a point-to-point interconnect, and each to provide the corresponding signals to the set of output signal lines coupled to the corresponding bus device;
a plurality of second shift registers, each coupled to at least one other second shift register by a point-to-point interconnect, and each to receive information signals from one of a set of input signal lines from a corresponding one of the plurality of bus devices, the information signals independent of and unsynchronized to the first bus;
the first bus coupled to each of the plurality of bus devices; and
bus logic having a first bus interface coupled to the first bus, an output shift register coupled to a first one of the plurality of first shift registers to transmit bit values unsynchronized to activity on the first bus, the output shift register having a plurality of bit positions to store bit values of states to be driven onto the sets of output signal lines and when a number of the plurality of bus devices is less than a supported number of bus devices for the bus logic, the bit values of the bit positions for the plurality of bus devices are the last bit values to be transmitted from the output shift register, and an input shift register coupled to a first one of the second shift registers to receive bit values unsynchronized to activity on the first bus, the input shift register having a plurality of bit positions to store bit values of states to be received from the sets of input signal lines and when the number of the plurality of bus devices is less than the supported number of bus devices, the bit values of the bit positions for the plurality of bus devices are the first bit values to be received in the input shift register.

13. The apparatus of claim 12, wherein each of the plurality of first shift registers is coupled to a single one of the plurality of bus devices.

14. The apparatus of claim 12, wherein the bus logic is to transmit all of the plurality of bit positions and to receive a number of the bit values corresponding to the supported number of bus devices even when the number of the plurality of bus devices is less than the supported number of bus devices.

15. The apparatus of claim 12, wherein the signals and the information signals are commonly clocked.

16. A system comprising:
a processor;
a plurality of bus devices, each bus device coupled to a first bus and to a corresponding one of a plurality of sets of output signal lines to receive signals therefrom, the signals independent of and unsynchronized to the first bus;
a plurality of first shift registers, each coupled to at least one other first shift register by a point-to-point interconnect, and each to provide the corresponding signals to the set of output signal lines coupled to the corresponding bus device;
a plurality of second shift registers, each coupled to at least one other second shift register by a point-to-point interconnect, and each to receive information signals from one of a set of input signal lines from a corresponding one of the plurality of bus devices, the information signals independent of and unsynchronized to the first bus;
a logic coupled to the processor, the logic including a first bus interface coupled to the first bus and having an output shift register coupled to a first one of the plurality of first shift registers to transmit bit values unsynchronized to activity on the first bus and an input shift register coupled to a first one of the second shift registers to receive bit values unsynchronized to activity on the first bus, the output shift register having a plurality of bit positions to store bit values of states to be driven onto the sets of output signal lines and when a number of the plurality of bus devices is less than a supported number of bus devices for the logic, the bit values of the bit positions for the plurality of bus devices are the last bit values to be transmitted from the output shift register, and the input shift register having a plurality of bit positions to store bit values of states to be received from the sets of input signal lines and when the number of the plurality of bus devices is less than the supported number of bus devices, the bit values of the bit positions for the plurality of bus devices are the first bit values to be received in the input shift register; and
a dynamic random access memory (DRAM) coupled to the logic.

17. The system of claim 16, further comprising:
a connector for hot-plugging another device; and
an isolation circuit coupled to the first bus, the connector, and at least one output signal line of the corresponding set of output signal lines to electrically isolate at least a portion of the connector from at least a subset of signal lines of the first bus in response to a state driven onto the at least one output signal line by the corresponding first shift register to enable hot-plugging the other device.

18. The system of claim 16, wherein each of the plurality of first shift registers is coupled to a single one of the plurality of bus devices.

19. The system of claim 16, wherein the logic is to transmit all of the plurality of bit positions and to receive a number of the bit values corresponding to the supported number of bus devices even when the number of the plurality of bus devices is less than the supported number of bus devices.

* * * * *